United States Patent
Kaneko

[11] Patent Number: 5,908,017
[45] Date of Patent: Jun. 1, 1999

[54] INTAKE SYSTEM MOUNTING CONSTRUCTION OF ENGINE

[75] Inventor: Hiroyuki Kaneko, Shizuoka-ken, Japan

[73] Assignee: Suzuki Motor Corporation, Shizuoka-ken, Japan

[21] Appl. No.: 09/012,761

[22] Filed: Jan. 23, 1998

[30] Foreign Application Priority Data

Jan. 31, 1997 [JP] Japan .................................. 9-032877

[51] Int. Cl.$^6$ .......................................................... F02F 7/00
[52] U.S. Cl. ................................ 123/195 A; 123/184.38
[58] Field of Search ......................... 123/195 A, 198 E, 123/563, 184.38, 184.57

[56] References Cited

U.S. PATENT DOCUMENTS 4,122,820  10/1978  Ryberg ............................... 123/198 E
4,519,347   5/1985  Nolff .................................. 123/195 A

*Primary Examiner*—Noah P. Kamen
*Attorney, Agent, or Firm*—Flynn, Thiel, Boutell & Tanis, P.C.

[57] ABSTRACT

An intake mounting system for an engine of either natural intake mode or supercharged intake mode. A first bracket is located on an end of a cylinder head of the engine. An air cleaner is mounted to the first bracket. A second bracket is connected to a head cover of the engine. A resonator used with a natural intake mode engine or an intercooler used with a supercharged intake mode engine can be mounted to the same second bracket. The air cleaner is also mounted to the second bracket. A third bracket is connected to the head cover of the engine. The resonator is also mounted to the third bracket.

13 Claims, 7 Drawing Sheets

FORWARD

INTAKE SYSTEM MOUNTING CONSTRUCTION OF ENGINE

FIELD OF THE INVENTION

The present invention relates to an intake system mounting construction of an engine and, more particularly, to an intake system mounting construction of a vehicle engine in which intake system structures can be mounted on the engine without interfering with a vehicle body, and when the engine has a different type of intake system structure, it can be mounted using common brackets with the intake system structures being capable of being mounted close to each other, thereby improving the external appearance of the engine.

BACKGROUND OF THE INVENTION

Engines mounted in an engine compartment of a vehicle or the like include an engine of natural intake mode in which air is taken in due to a differential pressure between the inside and the outside of a combustion chamber, and an engine of supercharger mode in which air is fed under pressure into a combustion chamber by a supercharger.

Such engines, as described above, are provided with auxiliary equipment such as a water pump, an intake system structure such as an air cleaner, and an exhaust system structure such as an exhaust manifold. A radiator, a battery and the like are also mounted in the engine compartment. However, in recent vehicles, since additional apparatuses such as an air conditioner, a power steering unit and the like are mounted thereon, the space in all directions in the engine compartment is narrow. Further, in recent engines, the intake system structures tend to be large-sized in view of problems of output, fuel cost, emissions or the like.

In such an engine as described above, in the case where an intake system structure such as an air cleaner is mounted, interferes with the vehicle body when the latter is mounted in the engine compartment. Therefore, it is necessary to mount the intake system structure after the engine is mounted on the vehicle body, resulting in an inconvenient mounting or assembling process.

Further, in the case where the intake system structures are mounted on the engine after the latter has been mounted in the engine compartment, they cannot be mounted close to each other from a viewpoint of space relative to other auxiliary equipment and apparatuses, resulting in an inconvenience of lowering the external appearance of the engine.

Furthermore, on some engines or even the same engine, the intake system structures are changed into a natural intake mode or a supercharger mode. In such an engine, in order to mount the intake system structures that are different in mode, it is necessary to provide one mounting bracket for the natural intake mode and another mounting bracket for the supercharger mode, resulting in an inconvenience and increasing cost.

SUMMARY OF THE INVENTION

To alleviate the aforementioned inconveniences, the present invention provides an arrangement wherein brackets are provided on which are mounted intake system structures disposed above an engine in an attitude mounted in an engine compartment of a vehicle and above auxiliary equipment provided on the engine.

The present invention is characterized in that there is provided a first bracket which mounts an air cleaner disposed above auxiliary equipment provided on one end of a cylinder head in the axial direction of the engine as mounted in the engine compartment of the vehicle, and there is provided a second bracket which mounts either a resonator or an intercooler and the air cleaner disposed above a head cover of the engine with the resonator or intercooler being disposed adjacent to the air cleaner, and further characterized in that there is provided a third bracket on which is mounted a resonator disposed above the head cover of the engine at an intermediate portion thereof more closely adjacent the other end of the engine.

In an intake mounting system of an engine according to the present invention, brackets are provided on which are mounted intake system structures disposed above an engine in an attitude mounted in an engine compartment of a vehicle and above auxiliary equipment provided on the engine. Therefore, when the engine is mounted in the engine compartment, the intake system structures mounted above the engine and the auxiliary equipment do not interfere with the vehicle body in all directions of the engine compartment, and even in an engine compartment which has a relatively narrow space in all directions, the intake system structures can be mounted on the engine before the engine is mounted in the vehicle by making use of the space above the engine and the auxiliary equipment so as to not interfere with the vehicle body.

Further, in the intake mounting system of an engine, there is provided a first bracket on which is mounted an air cleaner disposed above auxiliary equipment provided on one end of a cylinder head of the engine in an attitude mounted in the engine compartment of the vehicle, and there is provided a second bracket on which are mounted the air cleaner and either a resonator or an intercooler as disposed above a head cover of the engine toward a second end of the engine adjacent to the air cleaner. Therefore, the intake system structures different in mode, such as the natural intake mode and the supercharger mode, can be mounted by making use of the same second bracket. It is not necessary to use separate brackets of the natural intake mode and the supercharger mode.

Further, with the second bracket, either a resonator or an intercooler can be mounted adjacent to the air cleaner. Therefore, the intake system structures can be easily mounted in proximity above the engine.

DETAILED DESCRIPTION

An embodiment of this invention will be explained hereinafter with reference to FIGS. 1 to 11 which show an embodiment of this invention.

Figure 11:
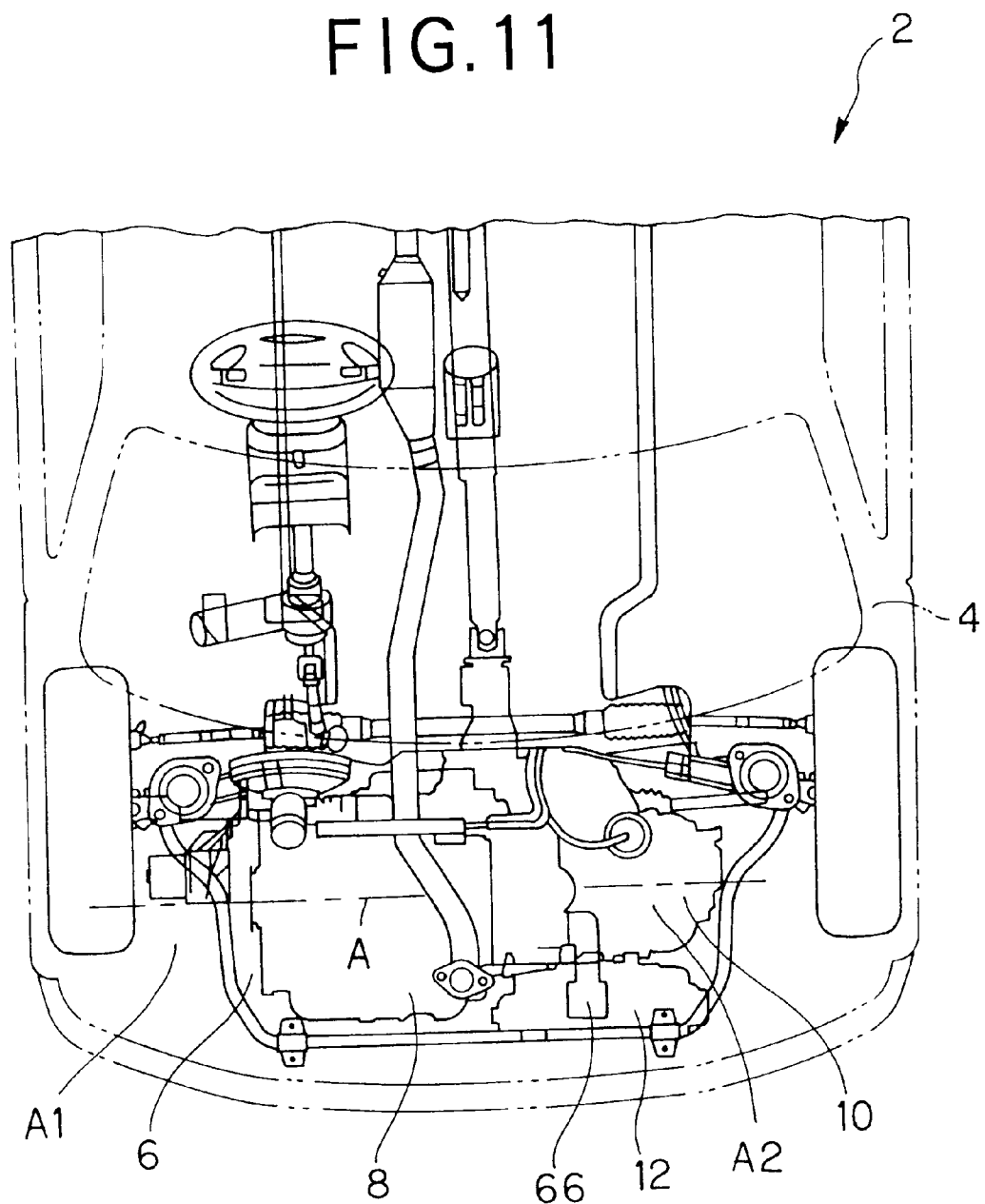
FIG. 11 is a schematic plan view of an engine compartment of a vehicle.

In FIG. 11, reference numeral 2 designates a vehicle, 4 a vehicle body, and 6 an engine compartment. An engine 8 is laterally (i.e. transversely) mounted in the engine compartment 6 relative to the direction of movement of the vehicle 2. A speed change gear 10 is provided in a lateral direction (right-side in FIG. 11) of the engine 8. Further, in the engine compartment 6, a radiator 12 is mounted on the front side with respect to the vehicle body 4.

Figure 7:
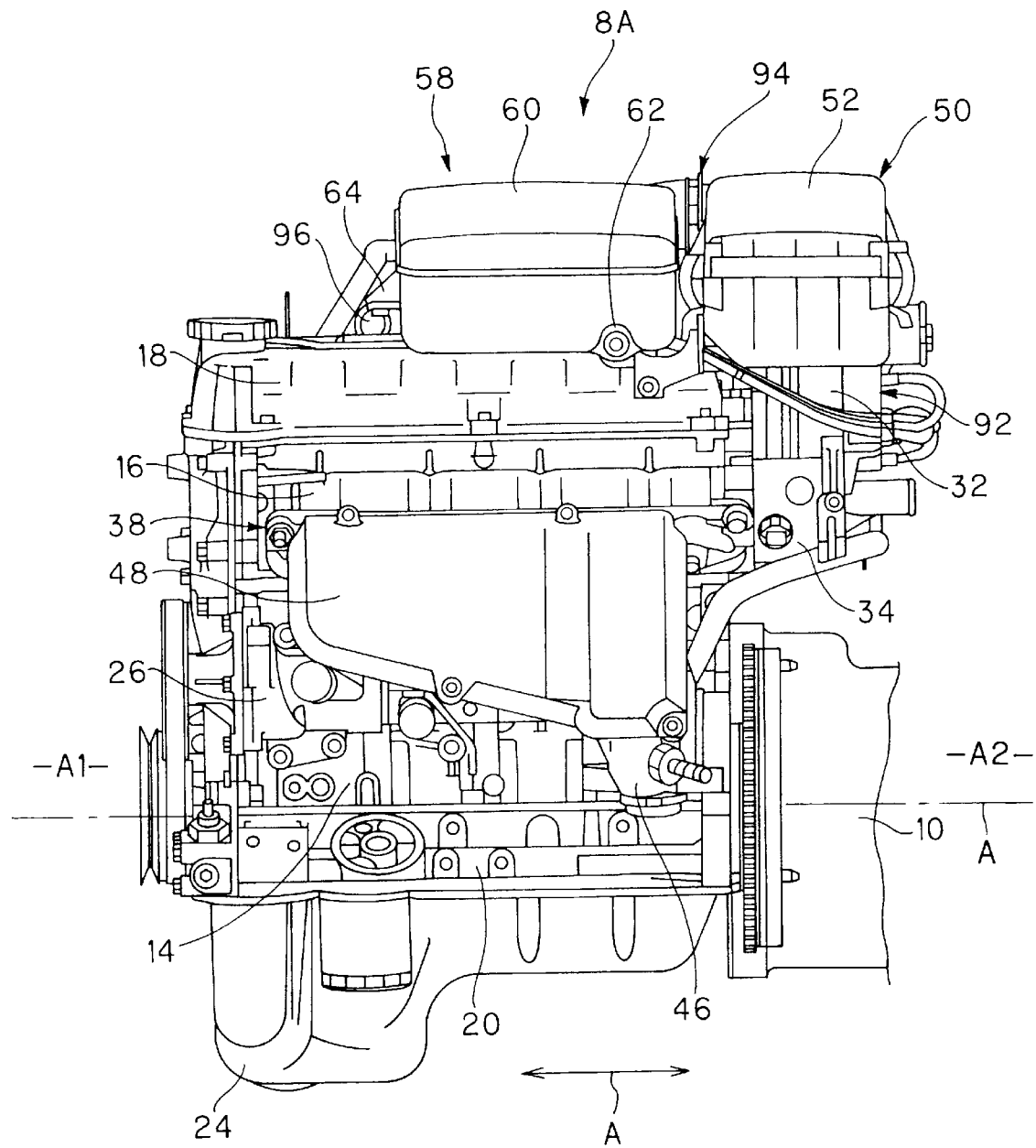
FIG. 7 is a front view of the engine in a natural intake mode and having the intake system structures mounted thereon.
Figure 8:
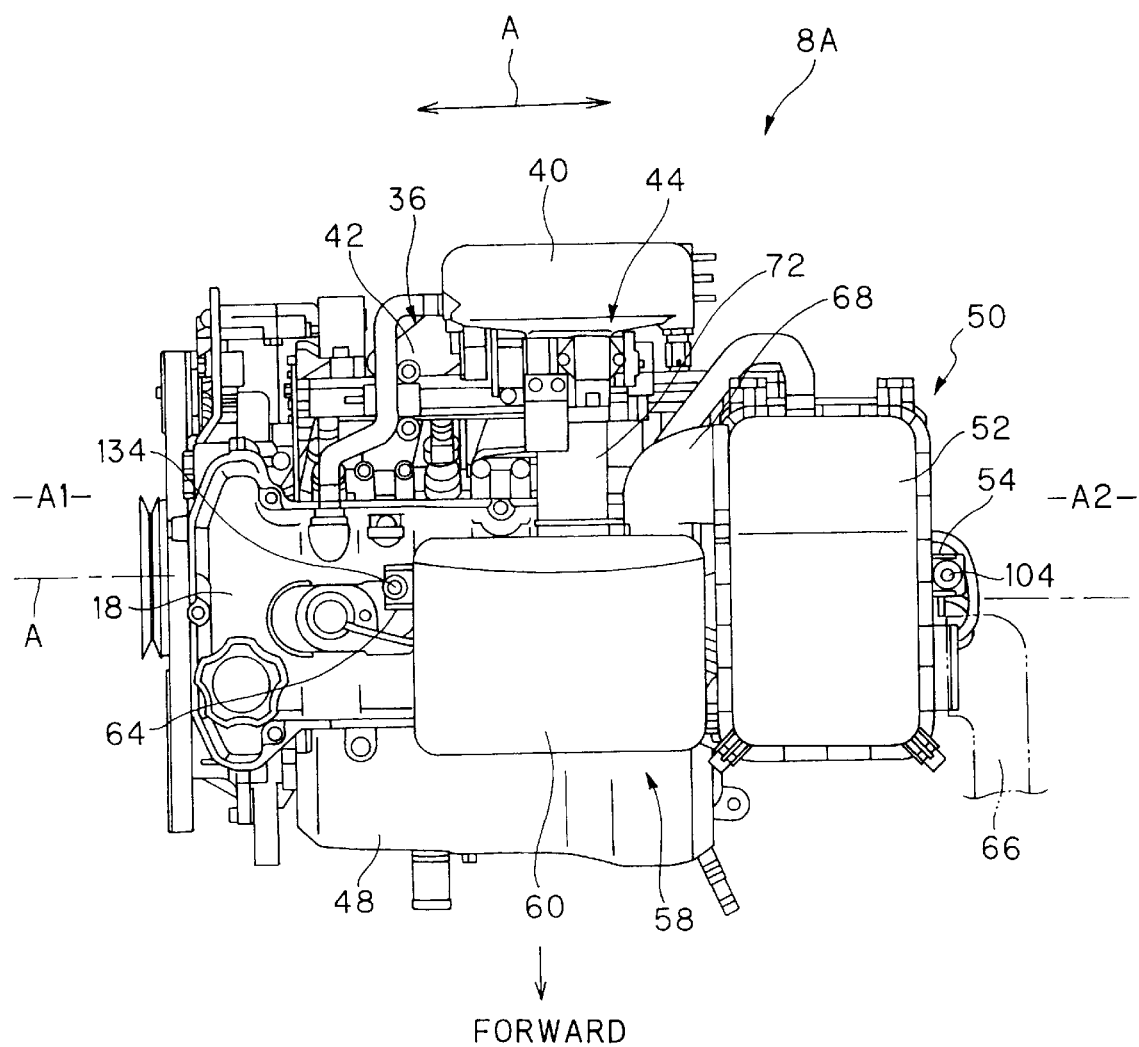
FIG. 8 is a plan view of FIG. 7.
Figure 9:
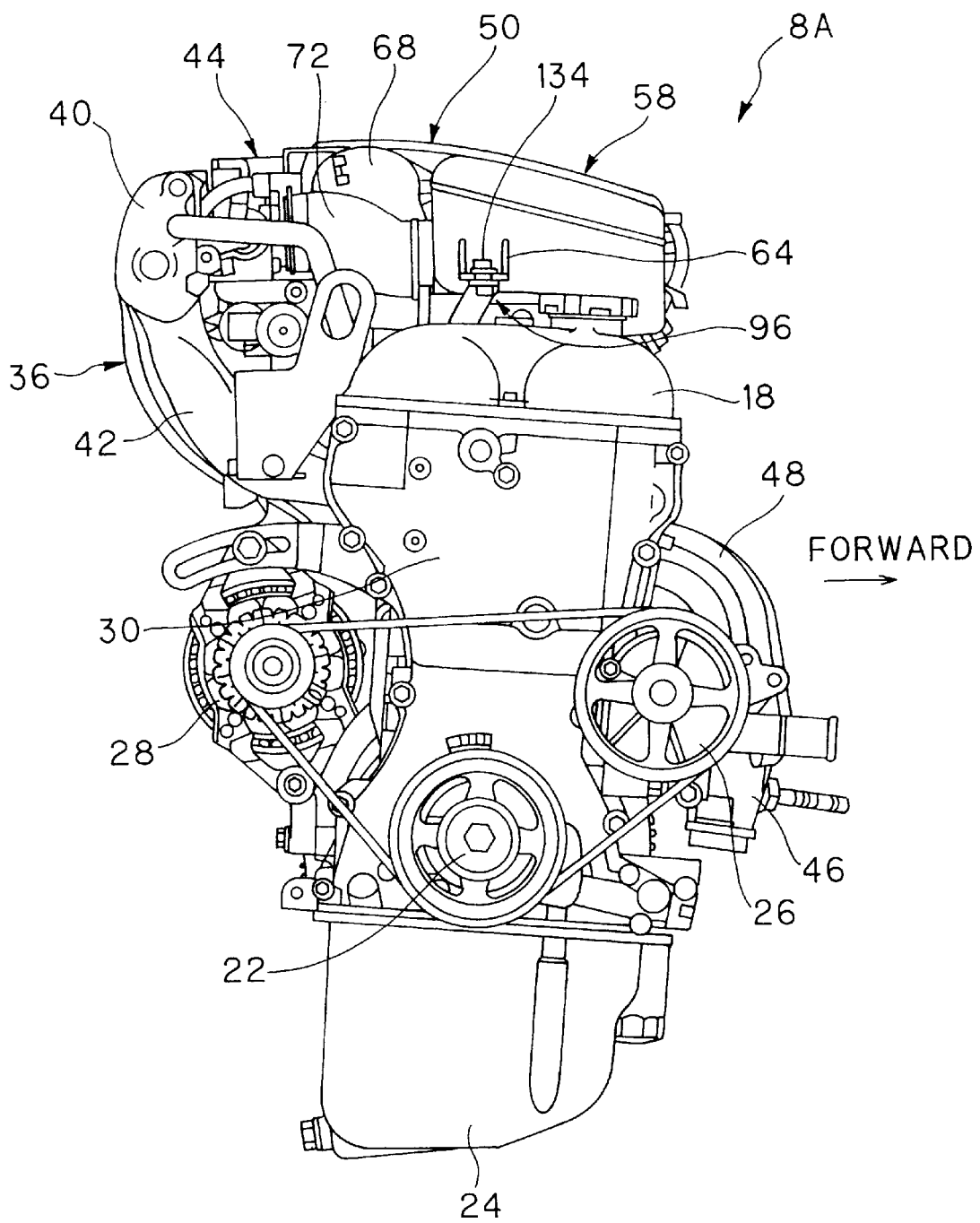
FIG. 9 is a side view of FIG. 7.
Figure 10:
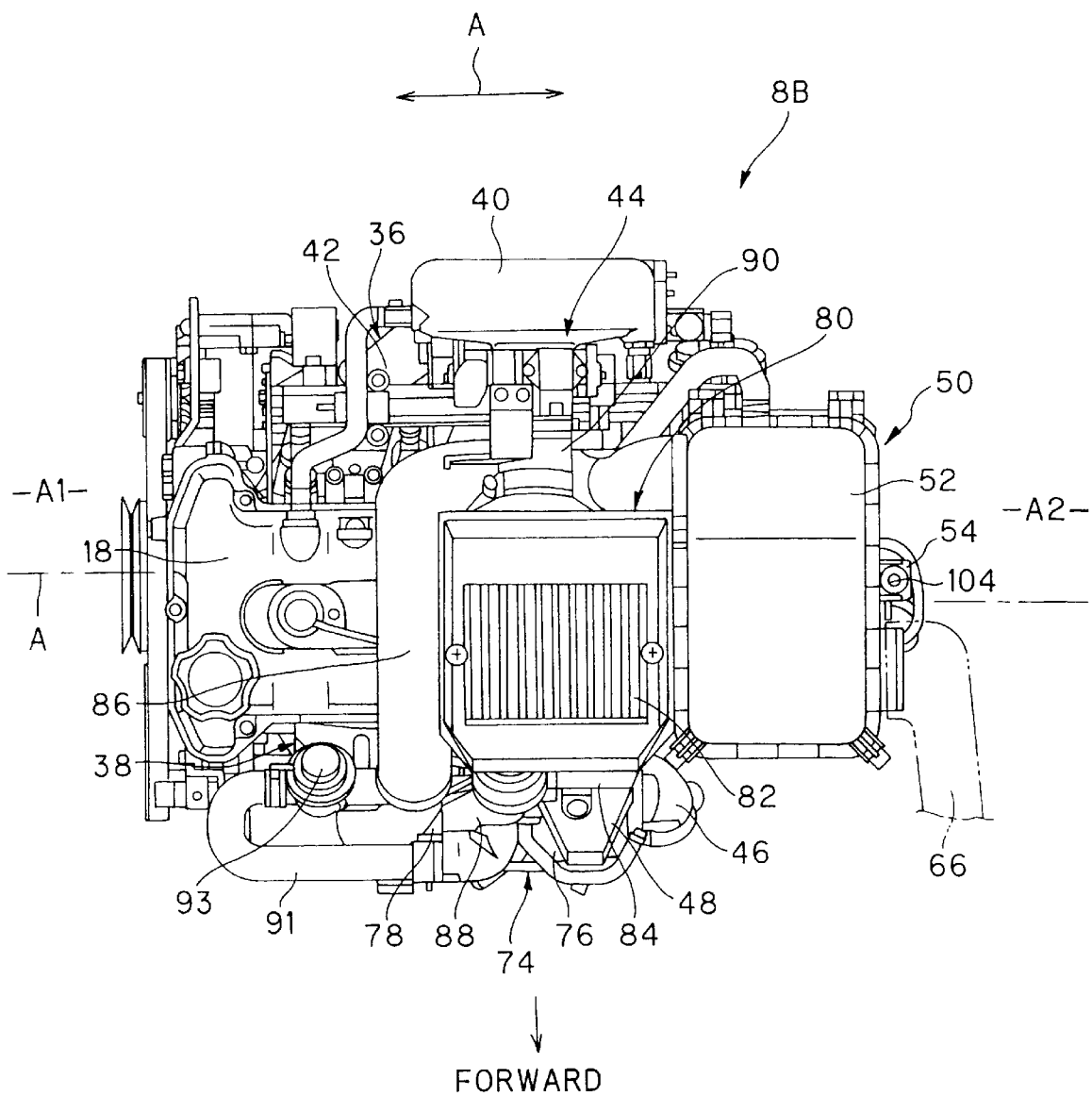
FIG. 10 is a plan view of the engine in a supercharger mode and having the intake system structures mounted thereon.

The engine as mounted in the engine compartment 6 ay be an engine 8A of natural intake mode as shown in FIGS. 7 to 9, and an engine 8B of supercharger mode as shown in FIG. 10.

The engine 8A of natural intake mode as shown in FIGS. 7 to 9 is mounted to be inclined forward with respect to the vehicle body 4. In this engine 8A, a cylinder head 16 is mounted above a cylinder block 14, a head cover 18 is mounted on the cylinder head 16, a lower case 20 is mounted below the cylinder block 14 to support a crankshaft 22, and an oil pan 24 is mounted on the lower case 20. The engine 8A has a crank axis A in the center of crankshaft 22. The arrow A indicates the axial direction that crankshaft 22 is oriented.

In the engine 8A, auxiliary equipment such as a water pump 26, an alternator 28 and the like driven by the crankshaft 22 are provided on the engine toward the end A1. A timing chain (not shown) for driving a valve-moving mechanism (not shown) is provided. Reference numeral 30 designates a chain cover to the timing chain. Auxiliary equipment such as a distributor 32 driven by a camshaft (not shown), a thermostat 34 for adjusting a temperature of cooling water and the like are provided on the engine toward the other end A2. The crank axis A has two ends, a first end A1 located to the right side of engine 8 in FIGS. 7 and 8, and a second end A2 on the left side of engine 8 in FIGS. 7 and 8. The ends A1 and A2 are defined adjacent opposite ends of the crankshaft axis A which extends longitudinally of the engine.

In the engine 8A, an intake manifold 36 constituting part of the intake system is provided on the intake side of the cylinder head 16 corresponding to the rear side of the vehicle body 4. An exhaust manifold 38 constituting part of the exhaust system is provided on the exhaust side of the cylinder head 16 corresponding to the front side of the vehicle body 4.

The intake manifold 36 includes a surge tank 40 positioned above, and a branch intake pipe 42 branching from the surge tank 40 and communicating with intake ports (not shown) of the lower cylinder head 16. The surge tank 40 is provided with a throttle body 44 attached thereto. The throttle body 44 is disposed with an air intake flow direction extending at a direction which crosses the direction of crank axis A.

The exhaust manifold 38 is provided with branch exhaust pipes (not shown) communicating with exhaust ports (not shown) of the cylinder head 16. The downstream sides of the branch exhaust pipes are gathered at a single exhaust pipe 46. The exhaust manifold 38 is covered with a heat shield plate 48.

The engine 8A is provided with an air cleaner 50 adjacent the end A2 of the engine and mounted above the distributor 32 and thermostat 34. In the air cleaner 50, a filter element (not shown) is encased in the cleaner case 52. A mounting flange 54 projects from one side of the case 52 in the direction of the end A2, and a mounting pin 56 (FIG. 6) projects from the other side of the cleaner case 52 in a direction toward the end A1.

Further, in the engine 8A, a resonator 58 is disposed adjacent the air cleaner 50 above the head cover 18 and at an intermediate axial portion between the opposite ends of the engine. The resonator 58 has a resonator case 60. A mounting boss 62 is provided at a lower part of resonator case 60 toward second end A2 and on the exhaust side with respect to the engine 8A. A mounting flange 64 projects from the side of case 60 which projects toward the end A1.

The air cleaner 50 is connected to one end of an air intake duct 66. The intake duct 66 has another open end that is directed toward the front end of the vehicle body 4 and is disposed above the radiator 12, as shown in FIG. 11. The air cleaner 50 and the resonator 58 are connected by a first air intake pipe 68. The resonator 58 and the throttle body 44 are connected in series by a second air intake pipe 72.

The intaking of air into the engine 8A of natural intake mode is accomplished by supplying air taken into the air cleaner 50 by the intake duct 66 to the resonator 58 by the first intake pipe 68, then supplying the air from the resonator 58 to the throttle body 44 by the second intake pipe 72, and thereafter supplying the air to combustion chambers (not shown) by the intake manifold 66.

The engine 8B of supercharger mode as shown in FIG. 10 is constructed similarly to the engine 8A of natural intake mode as shown in FIGS. 7 to 9, except that part of the air intake system is different. The parts of the engine 8B that are common with engine 8A are indicated by the same reference numerals.

The engine 8B (FIG. 10) of supercharger mode is mounted so as to be inclined forward with respect to the vehicle body 4. The engine 8B is provided with a supercharger 74 in the middle of the exhaust pipe 46 of the exhaust manifold 38. The supercharger 74 comprises a turbine portion 76 and a compressor portion 78, the turbine portion 76 being located generally midway along the exhaust pipe 46.

In the engine 8B, an intercooler 80 is positioned at an intermediate axial portion relative to crank axis A above the head cover 18 and adjacent to the air cleaner 50. The intercooler 80 has a cooler portion 82. A mounting boss portion 84 is provided at a lower part of cooler portion 82 on the exhaust side with respect to the engine 8B.

The air cleaner 50 and the compressor portion 78 of the supercharger 74 are connected by a first air intake pipe 86. The compressor portion 78 of the supercharger 74 and the intercooler 80 are connected by a second air intake pipe 88. The intercooler 80 and the throttle body 44 are connected in series by a third air intake pipe 90.

The intaking of air into the engine 8B of supercharger mode is accomplished by supplying and compressing air taken into the air cleaner 50 by the intake duct 66 to the supercharger 74 by the first intake pipe 86 then supplying the air to the intercooler 80 by the second intake pipe 88 to be cooled, and after that, supplying the air to the throttle body 44 by the third intake pipe 90 and supplying the air to combustion chambers (not shown) by the intake manifold 36.

Reference numeral 91 designates an air bypass pipe, and 93 an air bypass valve for bypassing the supercharger if desired.

The nature intake mode engine 8A and the supercharger mode engine 8B are provided with brackets on which are mounted intake system structures disposed above the engine 8 and above the auxiliary equipment mounted on the engine 8.

The engine 8 (FIGS. 1 and 2) has first, second and third mounting brackets 92, 94 and 96, respectively, which can be used irrespective of the intake system structure. The brackets 92, 94 and 96 can be used with either the intake system structure of natural intake mode or the intake system structure of supercharger mode.

Figure 1:
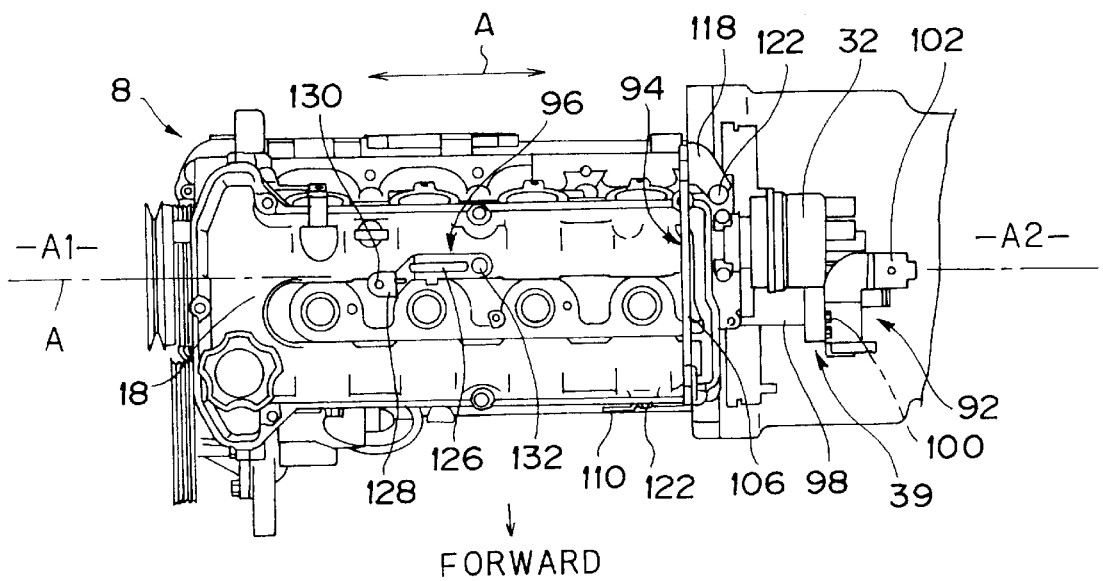
FIG. 1 is a plan view of an intake system mounting construction of the engine showing an embodiment of the present invention.
Figure 2:
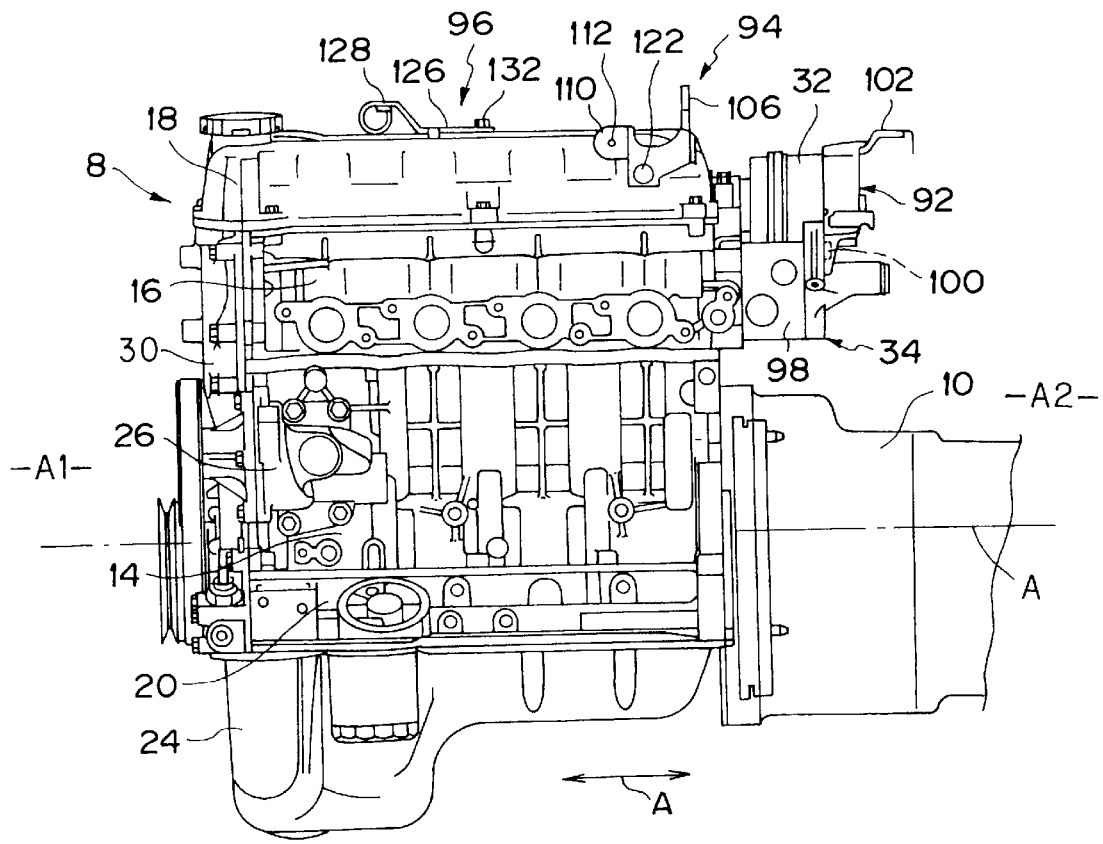
FIG. 2 is a front view of FIG. 1.

On the first mounting bracket 92 are mounted the distributor 32 and the air cleaner 50 as disposed above the thermostat 34. The first bracket 92 is mounted on a thermocase 98 for the thermostat 34 by a mounting bolt 100 and is provided with a cleaner mounting portion 102, as shown in FIGS. 1 and 2. The mounting flange 54 of the air cleaner 50 is mounted on the cleaner mounting portion 102 by a mounting bolt 104, as shown in FIGS. 8 and 10.

Figure 3:
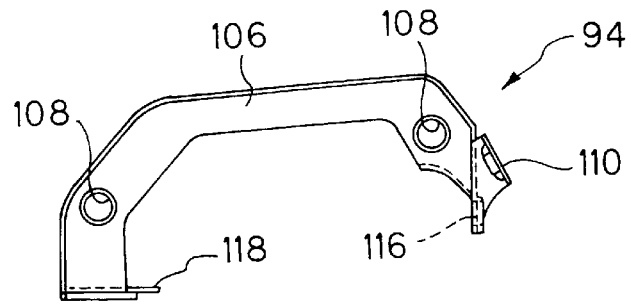
FIG. 3 is a side view of a mounting bracket according to the invention.
Figure 4:
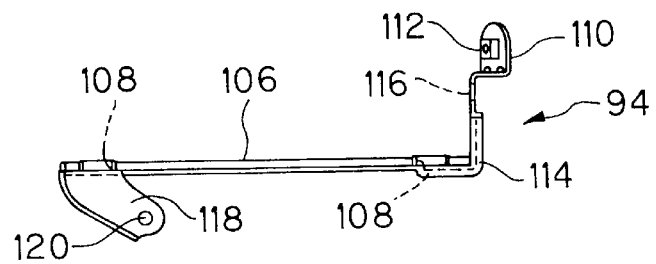
FIG. 4 is a bottom view of the bracket of FIG. 3.

On the second mounting bracket 94 are mounted the air cleaner 50 and either the resonator 58 or the intercooler 80 as disposed above the head cover 18 of the engine 8. In the second bracket 94, as shown in FIGS. 3 and 4, a cleaner mounting hole 108 is provided in a substantially circular-shaped or C-shaped elongate flange portion 106. An intake system mounting portion 110 for mounting either the resonator 58 or the intercooler 80 is bent and projects sidewardly from one longitudinal end of the flange portion 106, and an intake system mounting threaded hole 112 is provided in the intake system mounting portion 110. Further, the second bracket 94 has a locating flange portion 114 (relative to the head cover 18) provided on the bent portion between the end of the flange portion 106 and the intake system mounting portion 110. A bracket side mounting hole 116 is provided in the intake system mounting portion 110. A bracket side mounting portion 118 is bent and projected sidewardly at the other longitudinal end of the flange portion 106, and a bracket side mounting hole 120 is provided in the bracket side mounting portion 118. The flange portions 110 and 118 project in opposite sideward directions from the C-shaped flange portion 106.

Figure 5:
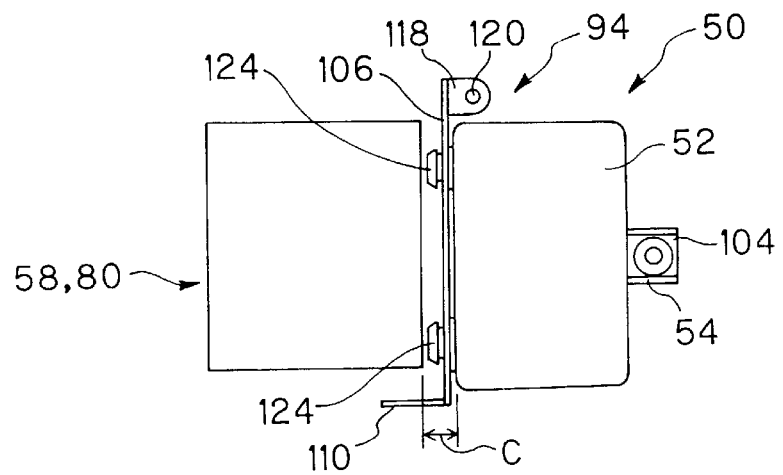
FIG. 5 is a plan view showing mounting of the air cleaner and resonator or the intercooler by the bracket of FIG. 3.
Figure 6:
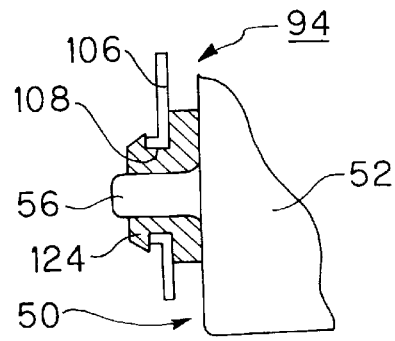
FIG. 6 is an enlarged sectional view of a part of FIG. 5.

The second bracket 94 is mounted, as shown in FIGS. 1 and 2, by bringing the locating flange portion 114 into contact with the head cover 18, and inserting mounting bolts 122 into the mounting hole 116 and the mounting hole 120 and into threaded engagement with the cylinder head 16 and the head cover 18. The mounting pins 56 of the air cleaner 50 are fitted in the cleaner mounting hole 108 of the flange portion 106 through grommets 124, as shown in FIGS. 5 and 6.

The air cleaner 50 is mounted with one side floating and the other side fixed by the threaded engagement of mounting bolt 104 between the mounting flange 54 and the first bracket 92, and the fitting of the mounting pins 56 into the grommets of the second bracket 94. Therefore, since the air cleaner 50 is fixedly fastened at only one point, the number of assembling processes and the number of parts can be reduced to lower the cost. Since the air cleaner 50 is mounted adjacent the resonator 58 and the intercooler 80, a clearance C (FIG. 6) between the resonator 58 and the intercooler 80 is minimized. The air cleaner 50, the resonator 58 and the intercooler 80 are disposed closer to each other, thus enabling the effective use space. Further, the C-shaped flange portion 106 of the second bracket 92 is positioned in this narrow space C and extends transverse to the direction of axis A.

Either the mounting boss portion 62 of the resonator 58 (FIG. 7) or the mounting boss portion 84 of the intercooler 80 (FIG. 10) is mounted on the intake system mounting portion 110 of the second bracket 94 by a suitable threaded bolt.

On the third bracket 96, the resonator 58 is mounted so as to be disposed above the head cover 18 of the engine 8 at an intermediate portion along the crank axis A. The third bracket 96 is provided, as shown in FIG. 1, with a cover mounting portion 126 which overlies and is mounted on an upper surface of the head cover 18, a resonator mounting portion 128 bent in two stages so as to be disposed upwardly from the cover mounting portion 126 and spaced above the head cover 18 in parallel with the upper surface thereof, and a resonator mounting threaded hole 130 extending downwardly through the portion 126.

In the third bracket 96, the cover mounting portion 126 is mounted on the head cover 18 by a mounting bolt 132. The mounting flange 64 of the resonator 58 is mounted on the resonator mounting portion 128 of the third bracket 96 by a mounting bolt 134, as shown in FIG. 9.

As described above, in the intake system mounting construction of the engine 8, the first and second brackets 92 and 94 are provided on which the air cleaner 50 and the resonator 58 or intercooler 80 are mounted so as to be disposed above the engine 8 and above the distributor 32 and thermostat 34. Thus, when the engine 8 is mounted in the engine compartment 6, the air cleaner 50 and the like (such as resonator 58 or intercooler 80) as mounted above the engine 8 and the auxiliary equipment 32, 34 do not interfere with the vehicle body 4 in all directions of the engine room 6, and even if the engine compartment 6 has only a relatively narrow space in all directions, the air cleaner 50 and the like can still be mounted on the engine 8 before the engine is mounted in the engine compartment by making use of the space above the engine 8 and the auxiliary equipment 32 and 34 so as to not interfere with the vehicle body 4.

Therefore, in the intake system mounting construction of the engine 8, with the air cleaner 50 and the like mounted on the engine in advance, the engine 8 can be mounted in the engine compartment 6 without the air cleaner 50 and the like interfering with the vehicle body 4. By eliminating mounting the air cleaner 50 and the like after the engine 8 has been mounted in the vehicle body 4, the number of assembling processes on the assembly line can be reduced so as to reduce cost.

Further, in the intake system mounting construction of the engine 8, there is provided the first bracket 92 on which is mounted the air cleaner 50 as disposed above the distributor 32 or the like provided on one end of the cylinder head 16, and there is provided the second bracket 94 on which are mounted the air cleaner 50 and either resonator 58 or intercooler 80 as disposed above head cover 18. Thus, the resonator 58 and the intercooler 80, which are intake system structures associated with different modes such as the natural intake mode and the supercharger mode respectively, can be mounted by making use of the same second bracket 94. It is not necessary to have separate brackets for the natural intake mode and the supercharge mode.

Therefore, in the intake system mounting construction of the engine 8, the engine 8A of the natural intake mode as well as the engine 8B of the supercharge mode can use the same first, second and third mounting brackets 92, 94 and 96, which makes it possible to reduce the cost.

When using the second bracket 94, either the resonator 58 or the intercooler 80 can be mounted adjacent to the air cleaner 50, whereby the air cleaner 50 and either the resonator 58 or the intercooler 80 can be easily mounted closer to each other above the engine 8.

Therefore, in the intake system mounting construction of the engine 8, the air cleaner 50 and either the resonator 58 or the intercooler 80 can be easily mounted closer to each other. The mounting properties can be enhanced by the proximate mounting of the intake system structures, the space can be effectively used, and a harness (not shown) can be covered with the air cleaner 50 or the like to improve the external appearance of the engine 8.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An intake mounting system for an engine, said engine including auxiliary equipment, a cylinder head, an air cleaner, a head cover, and at least one of a resonator and an intercooler, the intake mounting system comprising first and second brackets, said first bracket being connected to one end of said cylinder head and mounting said air cleaner thereon, said second bracket being connected to said head cover and mounting said air cleaner and said at least one of said resonator and intercooler thereon, said air cleaner and said at least one of said resonator and intercooler being held above said head cover by said second bracket, and said at least one of said resonator and intercooler being adjacent said air cleaner.

2. An intake mounting system of an engine according to claim 1, including a third bracket mounting said at least one of said resonator and intercooler.

3. An intake mounting arrangement for an engine having auxiliary equipment, the arrangement being operable with engines of natural intake mode and of supercharged intake mode, comprising:

one bracket connected to a head cover at one end thereof and having mounted thereon a resonator for use with a natural intake mode engine or an intercooler for use with a supercharged intake mode engine such that the resonator or intercooler is at least partially supported by said one bracket and is disposed above the head cover at a position between the ends of the engine, said one bracket further having an air cleaner mounted thereon such that the air cleaner is at least partially supported by said one bracket, the air cleaner being disposed adjacent one end of the engine and closely adjacent the resonator or intercooler.

4. The arrangement according to claim 3, including a further bracket connected to the head cover at an intermediate position along the engine and having mounted thereon the resonator so that the resonator is supported by said one and further brackets.

5. The arrangement according to claim 3, including a further bracket located at an end of a cylinder head of the engine, the air cleaner being disposed above auxiliary equipment located at the end of the engine and mounted to the further bracket such that the air cleaner is supported by said one and further brackets.

6. The arrangement according to claim 3, including at least one grommet disposed between the air cleaner and said one bracket.

7. The arrangement according to claim 3, wherein said one bracket has at least one air cleaner mounting hole.

8. The arrangement according to claim 3, wherein said one bracket has an intake system mounting portion for mounting the resonator or the intercooler.

9. The apparatus according to claim 3, wherein the said one bracket allows the air cleaner and the resonator or intercooler to be mounted to the engine before the engine is mounted in a vehicle engine compartment.

10. The arrangement according to claim 3, wherein said one bracket has an elongate center part which at one end joins to a sidewardly projecting first mounting bracket part and which at its other end joins to a sidewardly projecting second mounting bracket part, said first and second mounting bracket parts projecting sidewardly in opposite directions from said elongate center part, said elongate center part extending transverse to the crankshaft axis of the engine and being disposed closely adjacent and directly between said air cleaner and said resonator or intercooler, said resonator or intercooler being attached to said first mounting bracket part, said air cleaner being attached to said elongate center part, and said second mounting bracket part being attached to the engine.

11. An intake mounting system arrangement for an engine having auxiliary equipment, the apparatus operable with engines of natural intake mode and of supercharged intake mode comprising:

a first bracket located at one end of a cylinder head of the engine, an air cleaner disposed above the auxiliary equipment which is located adjacent said one end of the engine, and the air cleaner being mounted to the first bracket;

a second bracket connected to a head cover of the engine and having mounted thereon a resonator for use with a natural intake mode engine or an intercooler for use with a supercharged intake mode engine such that the resonator or intercooler are at least partially supported by the second bracket, the intercooler or resonator being disposed above the head cover at an intermediate portion of the engine, the second bracket further having the air cleaner mounted thereon such that the air cleaner is supported by the first and the second brackets, the air cleaner being disposed closely adjacent to the resonator or intercooler; and a third bracket connected to the head cover at an intermediate portion of the engine and having mounted thereon the resonator, the resonator disposed above the head cover of the engine and the third bracket, the resonator being supported by the second and the third brackets.

12. The apparatus according to claim 11, including at least one support grommet disposed between the air cleaner and the second bracket.

13. The apparatus according to claim 11, wherein the brackets allow the resonator or intercooler and the air cleaner to be mounted to the engine before the engine is mounted in a vehicle engine compartment.

* * * * *